United States Patent
Goodwill

(12)
(10) Patent No.: US 6,509,992 B1
(45) Date of Patent: Jan. 21, 2003

(54) FREE SPACE OPTICAL INTERCONNECT SYSTEM TOLERANT TO MISALIGNMENTS AND METHOD OF OPERATION THEREOF

(75) Inventor: Dominic J. Goodwill, Kanata (CA)

(73) Assignees: Nortel Networks Corporation, Montreal (CA); Nortel Networks Limited, Montreal (CA)

(*) Notice: Subject to any disclaimer, the term of this patent is extended or adjusted under 35 U.S.C. 154(b) by 0 days.

(21) Appl. No.: 09/392,534

(22) Filed: Sep. 9, 1999

(51) Int. Cl.[7] .............................................. H04B 10/00
(52) U.S. Cl. .................... 359/159; 359/153; 359/139.05
(58) Field of Search ................................ 359/159, 152, 359/153, 172, 136, 139.05; 356/141.3

(56) References Cited

U.S. PATENT DOCUMENTS

| | | | | |
|---|---|---|---|---|
| 4,330,204 A | * | 5/1982 | Dye ...................... | 359/139.05 |
| 4,823,402 A | * | 4/1989 | Brooks ....................... | 359/159 |
| 4,867,560 A | * | 9/1989 | Kunitsugu ............. | 356/139.05 |
| 5,030,004 A | * | 7/1991 | Grant et al. ................ | 356/153 |
| 5,142,400 A | * | 8/1992 | Solinsky ..................... | 359/159 |
| 5,532,860 A | * | 7/1996 | Hershey et al. ............. | 359/159 |
| 5,953,146 A | * | 9/1999 | Shelby ....................... | 359/159 |

\* cited by examiner

*Primary Examiner*—John Tweel

(57) ABSTRACT

A free space optical interconnect system having redundant elements of a transmitter and/or receiver and being tolerant to misalignments is provided. The system provides monitoring of a misalignment between the transmitter and receiver, including determining of a direction and amplitude of the misalignment. When the amplitude of the misalignment is exceeding a pre-determined threshold value, the data to be transmitted is re-routed from the element which is misaligned to a redundant element selected along a direction associated with the direction of the misalignment so as to ensure data transmission through the system. In an embodiment of the invention, monitoring of the misalignment and determining of the direction and the amplitude of the misalignment is performed by measuring of a position of a laser spot of a dedicated alignment laser on a dedicated detector. Optionally, redundant elements may be arranged into clusters, the number of clusters being redundant and the number of elements in each cluster being sufficient to accommodate the number of data channels to be transmitted. The elements of the system may be arranged into one-dimensional or two-dimensional arrays, or any other required pattern, the elements of the transmitter being optical emitters or optical modulators. The system described above is suitable for both uni-directional and bi-directional data transmission. A corresponding method for operating of such a system is also provided.

55 Claims, 3 Drawing Sheets

FREE SPACE OPTICAL INTERCONNECT SYSTEM TOLERANT TO MISALIGNMENTS AND METHOD OF OPERATION THEREOF

FIELD OF THE INVENTION

The invention relates to a free space optical interconnect system and a method of operation thereof, in particular to the system and method providing tolerance to misalignments.

BACKGROUND OF THE INVENTION

Free space optical interconnect systems have long been proposed to deliver fast, highly parallel data transfer. These systems have the potential to obviate limitations of electrical interconnects, which are not capable of supporting data throughputs beyond a capacity of several hundred Gb/s, and to increase the capacity up to the Terabit/s range. Thus free space interconnect systems are promising and attractive alternatives for various telecommunication and computing applications.

However, the most important challenge preventing the current acceptance of free space interconnect systems is alignment. Two issues are of concern: the precision to which it is possible to align the system, and the precision to which it is necessary to maintain this alignment during operation. For practical applications it is necessary to establish and maintain alignment of circuit boards carrying transmitters and receivers, which may comprise an array of pixels, to within 10's of microns over a distance of meters. Such a system requires extremely expensive highly precision optomechanics, and to date has been implemented only in a controlled laboratory environment. In real product usage, when vibrations, temperature fluctuations and temperature gradients are encountered, the optical links move out of alignment and data is not correctly transferred.

Therefore, the goal of providing some alignment tolerance for optical links is to ensure the correct operation of all of the pixels on each array at the highest possible speed. Correct operation is defined as the correct reception of a logic 1 or logic 0 signal. Once the laser power, the receiver sensitivity and the detector area have been defined, the probability of correct reception of the logic bits is mainly a function of optical beam misalignment. Misalignment mechanisms can be due solely to mechanical movements, but in practice, optical effects can also contribute. Six degrees of freedom of the mechanical movements: translation in x, y, and z ($\Delta x$, $\Delta y$, $\Delta z$) and rotation about the x, y, and z axes ($\theta_x$, $\theta_y$, $\theta_z$), where x and y axes define the plane of an optical module in its nominal alignment position, with z axis being perpendicular to this plane, result in a number of optical effects. These include an image shift ($\Delta x$, $\Delta y$), image rotation ($\theta_z$), defocus ($\Delta z$) and image tilt ($\theta_x$, $\theta_y$). Image shift and rotation are basically lateral translation effects, and defocus and image tilt introduce defocus effects. Contributors to the overall lateral misalignment effects include:

- mechanical misalignment in x and y;
- mechanical rotation about the z axis;
- mismatches in focal lengths;
- wavelength shifts and laser mode-hops caused by temperature fluctuations and resulting in beam deflections introduced by diffractive elements;
- distortions of the image of an array of sources by the interconnect lens system, and
- telecentricity, when defocus, in addition to increasing spot size, introduces lateral misalignments in nontelecentric systems.

Contributors to the overall defocus effects include:
- source array tilt;
- image tilt;
- curvature of the plane of best focus;
- mechanical tilt about x and y axes;
- misalignment along z axis.

Numerous attempts have been made to increase alignment tolerance for optical interconnect systems which may be categorized as passive, active, or dynamic strategies.

However, passive alignment of dense, high speed free space optical interconnects for distances of more than 1 cm require mechanical support structures that are too expensive, difficult to align, and insufficiently stable for commercial applications, see, e.g., "Optoelectronic ATM switch employing hybrid silicon (MOS/GaAs) FET-SEEDS", A. L. Lentine et al., SPIE Proceeding, vol. 2692, pages 110–108, 1996; and "Optical bus implementation system using Selfoc lenses", K. Namanaka, Optics Letters, Vol. 16, No. 16, pp. 1222–1224, August 1991. Passive alignment is done before any devices are powered up. This alignment technique is used in almost all electrical connectors, and most optical fiber connectors are passive. Recently, solder bump techniques have been applied to certain free space optical interconnect components, and preliminary reports indicate the potential for submicron alignment in all 6 degrees of freedom over a scale of up to 1 cm, J. W. Parker "Optical Interconnection for Advanced Processor Systems: A Review of the ESPRIT II OLIVES Program", L. Lightwave Technology 9 (12), 1764–1773, 1991.

Active alignment requires some feedback about the quality of the alignment. Usually the feedback is achieved by illuminating the system and monitoring the alignment either visually or by measuring a photocurrent in the detectors. Real-time active alignment is necessary if the alignment tolerances are tight or the system stability is poor so that the system will not remain aligned for a reasonable length of time. In this case, the feedback and alignment actuators must be integrated into the system to ensure permanent alignment. For example, CANON manufacturer uses image recognition and active beam-steering using a liquid filled variable angle prism in a single channel 155 Mb/s link product, which currently costs $100K. The product uses built in viewing cameras and optical pattern recognition techniques to define the system alignment, the complexity and cost of such a system clearly limiting widespread application. Alternatively, NTT has a system using actively controlled variable angle liquid filled prisms for board to board parallel free space optical interconnect, see. e.g. "Optical beam direction compensating system for board-to-board free space optical interconnection in high-capacity ATM switch", K. Hirabayashi et al., Journal of Lightwave Technology, Vol. 15, No. 5, May 1997. Cost, size, environmental ruggedness and reliability of these systems remain concerns.

Additionally, to develop both a marketable and reliable system, devices have to be packaged in a useful and reliable manner. For large systems including cumbersome and bulky mechanical parts providing alignment, this could involve a significant amount of physical space just to house all the individual components.

Recently, a proposal for avoiding high precision mechanics in free space interconnect systems by use of redundant arrays of detectors has been put forward by F. A. P. Tooley in IEEE Journal of Selected Topics in Quantum Electronics April 1996, vol. 2, No. 1, pp. 3–13 and in Digest, IEEE Summer Topical Meetings, Aug. 5–9 1996, p. 55–56. This system increases tolerance to misalignment by providing an array of detectors in place of a single detector and electrically re-routing the misaligned optical data to the correct channel, or, alternatively, by replicating the signal a number of times. The overhead associated with increasing the alignment tolerance requires a control and router circuit, which adds electrical power consumption.

In patent application Ser. No. 09/150,242 to Dominic Goodwill it has been proposed to arrange redundant elements into redundant clusters, the number of elements in each cluster being sufficient to accommodate the number of data channels to be transmitted. The system also includes means for identifying a misalignment between the transmitter and the receiver, and means for re-routing data from the cluster which is misaligned to the redundant cluster which thus re-directs data to/from the correct physical location.

Unfortunately, there is a drawback associated with the use of redundant elements in optical interconnect systems. Re-routing of data between the redundant elements or clusters requires time for hunting for an appropriate available element or cluster which would provide reliable data transmission through the system. While hunting, some of the data transmitted is inevitably lost. Accordingly, the faster the hunting and re-routing, the more reliable the optical interconnect system is. If the hunting process takes too long, it may result in losing the optical link at all which is not acceptable in many circumstances. It also limits general applications of free space optical interconnect systems.

Therefore there is a need for development of free space optical interconnect systems tolerant to misalignments and methods of operation thereof which would provide reliable data transmission through the system.

SUMMARY OF THE INVENTION

Thus, the present invention seeks to provide an optical interconnect system and method which avoids or reduces the above-mentioned problems.

Therefore, according to one aspect of the present invention there is provided a free space optical interconnect system comprising:
- a transmitter and a receiver, at least one of the transmitter and the receiver comprising a plurality of elements whose number is redundant;
- means for monitoring a misalignment between the transmitter and the receiver including means for determining a direction and an amplitude of the misalignment; and
- means for re-routing data from the element which is misaligned to a redundant element selected along a direction associated with the direction of the misalignment so as to provide data transmission through the system, the re-routing being performed in response to a signal generated by the monitoring means.

The means for monitoring the misalignment may include means for monitoring a signal connection parameter between the transmitter and the receiver, e.g. a signal parameter at the receiver or at the transmitter. Alternatively the signal connection parameter may be a signal parameter of at least one element of at least one of the transmitter and the receiver. Conveniently, the signal connection parameter is an intensity of the data signal.

In an embodiment of the invention, means for monitoring the misalignment between the modules includes a dedicated alignment laser and a dedicated detector, with the means for determining the direction and the amplitude of the misalignment including a circuitry for measuring a position of the laser spot of the alignment laser on the dedicated detector. Alternatively, means for monitoring the misalignment may include a detector selected from the group consisting of detectors for monitoring lateral and vertical misalignments, and detectors for monitoring tilt misalignments or other known suitable detectors. Optionally, the means for monitoring the misalignment may further comprise means for providing feedback between the transmitter and the receiver regarding the misalignment, which can be conveniently selected from optical fiber, LED, electrical cable, electrical backplane or other suitable means. As an alternative to the embodiment described above, means for determining the direction and the amplitude of the misalignment may include means for measuring an intensity distribution at the receiver elements.

The elements of the transmitter and/or receiver may be arranged into a one-dimensional or two-dimensional array, or any other pattern providing the required optical transmission or collection. Alternatively, the elements of the transmitter and/or receiver may be arranged into clusters, the number of clusters being redundant and the number of elements in each cluster being sufficient to accommodate the number of data channels to be transmitted. If required, the elements may be shared by different clusters. The system may comprise one transmitter and one receiver only to provide a uni-directional interconnection. Alternatively, the system may comprise two modules, each module having one transmitter and one receiver, thus providing for a bi-directional transmission and receiving of data. It may be arranged that the receiver only has redundant elements. If required, the transmitter only may have redundant elements or redundant clusters.

Preferably, the system is implemented with optical elements, such as bulk optics (lenses, prisms, mirrors, splitters, et al.), binary optics (fanout gratings, diffractive lenses, et al.), holographic elements, and integrated optics.

Preferably, the elements of the transmitter are optical emitters or optical modulators. The emitters may be vertical cavity surface emitting lasers (VCSEL), light emitting diodes (LED) and edge emitting laser diodes or other known devices. The modulators may be modulators based on magneto-optic effect, modulators including liquid crystal devices, ferroelectric modulators, e.g. lead lanthanum zirconate titanate (PLZT) modulator, modulators including piezo-electric crystals, modulators including deformable mirrors, electro-optical semiconductor hetero-structure modulators, optical cavity modulators, or other known modulators.

The receiver of the optical interconnect system comprises at least one detector, preferably from PIN detector, metal-semiconductor-metal detector, avalanche photodiode, or other known detectors.

Preferably, the transmitter and/or receiver, or the whole system described above are integrated within a package or several packages, thus providing compactness and efficient use of space.

According to another aspect of the invention there is provided a module for free space optical interconnect system, comprising:
- at least one of a transmitter and a receiver, at least one of the transmitter and the receiver comprising a plurality of elements whose number is redundant;
- means for monitoring a misalignment of the module including means for determining a direction and an amplitude of the misalignment; and
- means for re-routing data from the element which is misaligned to a redundant element selected along a direction associated with the direction of the misalignment so as to provide data transmission through the system, the re-routing being performed in response to a signal generated by the monitoring means.

Beneficially, the means for monitoring the misalignment of the module comprises means for monitoring a signal connection parameter at the module, e.g. an intensity of the signal. Alternatively, the means for monitoring the misalignment may comprise detectors for monitoring lateral and vertical misalignments, detectors for monitoring tilt misalignments or any other suitable known detectors. In an embodiment of the invention, means for monitoring the misalignment of the module includes a dedicated detector, with the means for determining the direction and the amplitude of the misalignment including means for measuring a position of a laser spot of a dedicated alignment laser on the dedicated detector. Alternatively, it may include means for measuring an intensity distribution, e.g. at the receiver elements. The module may include one transmitter or one receiver only for a uni-directional link. If required, it may include both the transmitter and receiver for corresponding transmitting and receiving of data in a bi-directional optical interconnect system. Preferably, the elements of the module are arranged into a one-dimensional array or two-dimensional array. Alternatively, they may be arranged so as to form a pre-determined pattern providing the required optical transmission or collection. Optionally, the redundant elements may be arranged into clusters, the number of clusters being redundant and the number of elements in each cluster being sufficient to accommodate the number of data channels to be transmitted. Accordingly, the means for re-routing comprises means for re-routing data from a cluster which is misaligned to a redundant cluster which provides data transmission through the system. If required, the elements may be shared between different clusters. Beneficially, the elements of the transmitter are optical emitters, e.g. VCSEL, SLD, LED, edge emitting laser diodes or other known emitters. Alternatively the elements of the transmitter may be optical modulators. The elements of the receiver may be selected from PIN detector, metal-semiconductor-metal detector, avalanche photodiode or other known suitable detectors. Beneficially, the module is integrated within a package.

According to yet another aspect of the invention there is provided a method of operating a free space optical interconnect system, comprising a transmitter and a receiver, at least one of the transmitter and the receiver having a plurality of elements whose number is redundant, the method comprising the steps of:

(a) monitoring a misalignment between the transmitter and the receiver, including determining a direction and an amplitude of the misalignment; and (b) when the amplitude of the misalignment is exceeding a pre-determined threshold value, re-routing data from the element which is misaligned to a redundant element selected along a direction associated with the direction of the misalignment so as to provide data transmission through the system.

Conveniently, the step of monitoring the misalignment comprises monitoring a signal connection parameter between the transmitter and the receiver, e.g. a signal parameter at the receiver or at the transmitter. Optionally, the step of monitoring the signal connection parameter comprises monitoring a signal parameter of at least one element of at least one of the transmitter and the receiver, e.g. monitoring intensity of the data signal. In the embodiment of the invention, the step of determining the direction and the amplitude of the misalignment comprises measuring a position of a laser spot of a dedicated alignment laser on a dedicated detector. Alternatively, this step may include measuring an intensity distribution, e.g. at the receiver elements.

Free space optical interconnect systems formed using the techniques described above are more reliable compared to other existing free space interconnect systems having redundant elements. Monitoring of the misalignment between the transmitter and the receiver, determining the direction and the amplitude of the misalignment and comparing the amplitude with the threshold value allows re-routing of data to available redundant elements well in advance before the quality of data transmission deteriorates substantially and before the link is dropped or data is lost. The use of redundant elements also obviates the need of packaging which requires precise alignment and which is often expensive and bulky. The interconnect systems based on the present invention have simpler mechanical design, have no moving parts and may be implemented with lower cost mechanics. As a result, they can be manufactured more readily and at much lower cost, and providing higher reliability at the same time.

BRIEF DESCRIPTION OF THE DRAWINGS

The invention will now be described in greater detail with references to the attached drawings wherein.

DETAILED DESCRIPTION OF THE PREFERRED EMBODIMENT

Figure 1:
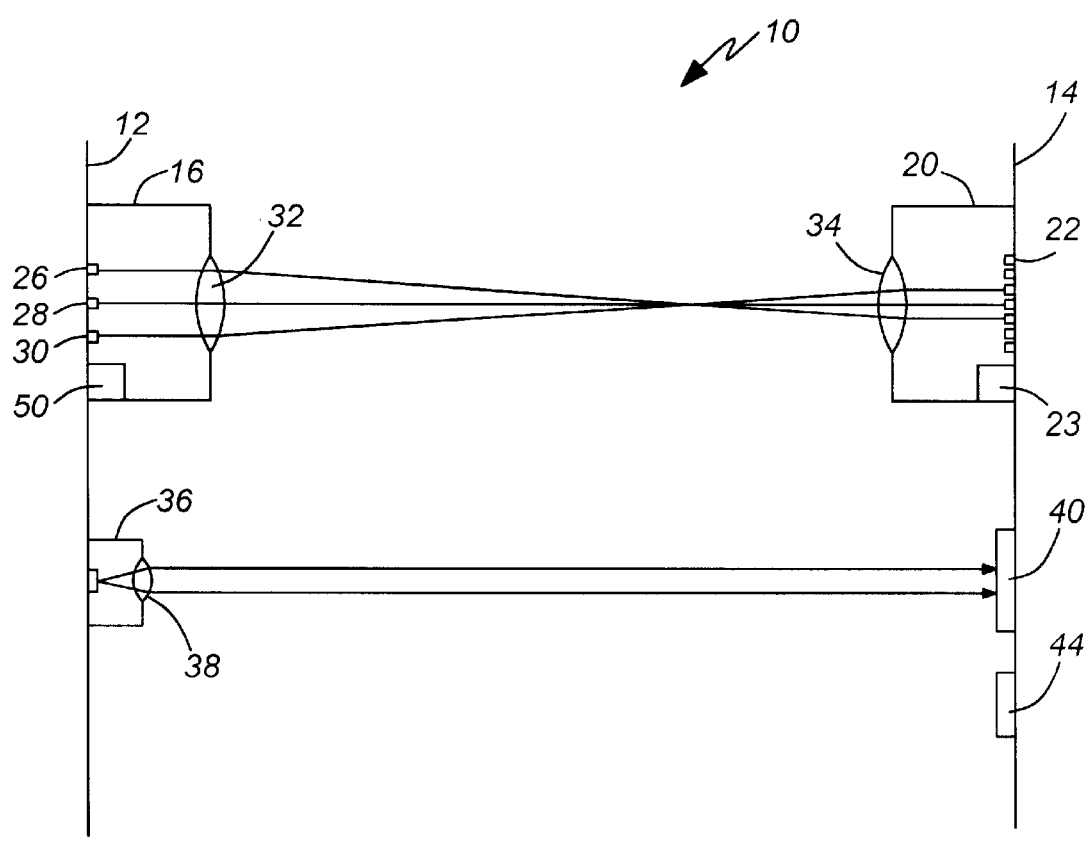
FIG. 1 illustrates a schematic view of a free space optical interconnect system for a uni-directional link according to an embodiment of the invention.

A schematic view of a free space optical interconnect system 10 according to the embodiment of the present invention is shown in FIG. 1. The system 10 comprises a first module 12, the module being a transmitter module, and a second module 14, the module being a receiver module, and provides a uni-directional link between the modules. The transmitter module 12 carries a transmitter 16 having a plurality of transmitter elements for transmission of data, the receiver module carrying the corresponding receiver 20 having a plurality of receiver elements 22 for receiving the data. The number of elements of the receiver 20 is redundant, i.e. more than necessary compared to the number sufficient to accommodate the data channels to be transmitted. Each of the transmitter elements is a vertical cavity surface emitting laser (VCSEL), emitting a beam normal to the plane of the module 12 through the lens 32 of the transmitter package 16, and the receiver elements are detectors, forming a one-dimensional array.

An arrangement of transmitter and receiver elements is shown in more detail in FIG. 2. As a way of example, the transmitter 16 carries three lasers 26, 28 and 30 which are arranged into a one-dimensional array, the distance between the adjacent lasers being 0.25 mm to 1.25 mm. The receiver 20 includes seven detectors 22 designated a1 to a7, three of them being used at any given moment for receiving data and the rest four of them being redundant and used for receiving data when the system is misaligned.

Lasers 26, 28, 30 are housed together with driver circuits 50 in a package on the transmitter module 12. Laser beams from lasers are emitted through the lens 32 collimating or nearly collimating the light and received at the detector array 22 being focused on the array through the lens 34. The detectors 22 are housed together with receiver circuits 23 in a package on the receiver module 14.

Means for monitoring a misalignment between the transmitter 16 and the receiver 20 is implemented by use of a dedicated alignment laser 36 and a large slow position sensing alignment detector 40 at the receiver module 14 (FIG. 1). The laser 36 is packaged with a lens 38 so as to emit a narrow beam perpendicular to the transmitter module 12. The beam is received by the detector 40 which monitors the mutual alignment of modules 12 and 14, and as a result, the alignment of the transmitter 16 and the receiver 20. Means for determining the direction and amplitude of the misalignment between the modules is implemented by use of control circuitry 44 at receiver module. The circuitry 44 monitors the current position of the alignment laser 36 on the detector 40 and compares it to the stored position of the alignment laser, the position being characterized by reliable data transmission between the modules. The receiver 20 also includes means for re-routing data between the detectors implemented by use of drive circuitry 23.

The system 10 is packaged in the following manner. The transmitter module 12 and receiver module 14 comprise part of printed circuit boards. The printed circuit boards are mounted in shelves, racks and frames made of plastic and metal. The printed circuit boards, shelves, racks and frames have holes and windows as necessary to allow the data, alignment and feedback light to pass. The lasers 26, 28, 30, the drive circuit 50 and the lens 32 are mounted using adhesives within a metal and ceramic multi-chip package, and the package is soldered onto the substrate of the transmitter module 12. Likewise, the detectors 22, the receiver circuit 23 and the lens 34 are similarly packaged and mounted.

Figure 2A:
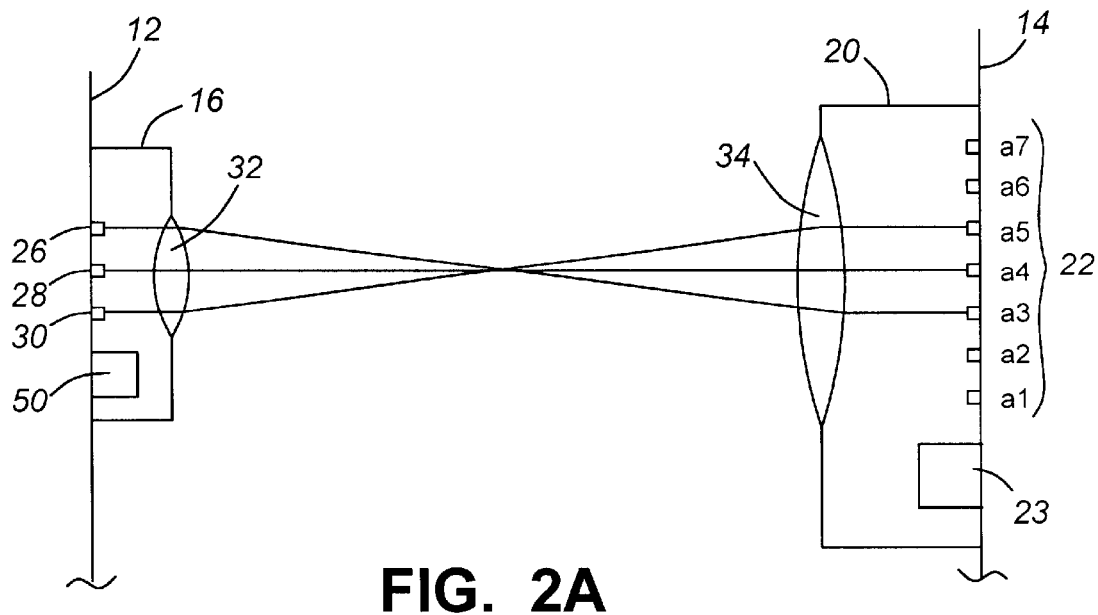
FIG. 2a illustrates an arrangement of the transmitter and receiver elements into one-dimensional array in the embodiment of FIG. 1.

The system 10 operates in the following manner. First, the data to be transmitted is routed to the lasers 26, 28, 30 which emit light collimated by lens 32 and sent to the receiver 20. The focusing lens 34 collects the light from the lasers and directs it on the detectors 22, e.g. producing spots on detectors a3, a4 and a5 from lasers 26, 28 and 30 respectively as shown in FIG. 2a which illustrates the situation when the system is initially aligned. Simultaneously, the alignment laser 36 sends a reference beam through the lens 38, and the beam is received by a position sensing alignment detector 40. The position of the reference beam on the detector 40, and consequently the position of the module 14, is read out by a control circuitry 44 and compared with a stored position (e.g. an aligned position of the system) which characterizes reliable data transmission between the modules. When the modules 12 and 14 are misaligned, the circuitry 44 detects a difference between the current and stored position of the reference beam and compares the difference with a pre-determined threshold value. The circuitry 44 also identifies a direction of the misalignment as a direction in which the reference beam of the alignment laser moves from the stored position to its current position. When the difference between the positions exceeds the threshold value, the circuitry 44 sends a signal to the receiver circuit 23 to re-route the data to redundant detectors, the new detectors in use being chosen in a direction associated with the direction of the misalignment as will be described below.

Figure 2B:
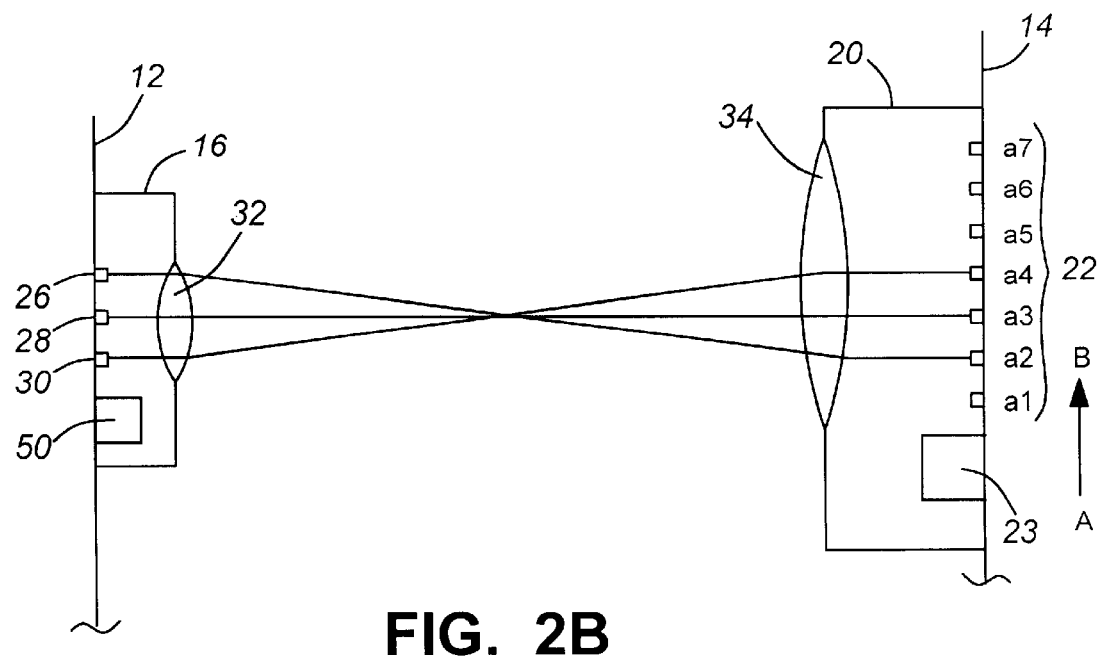
FIG. 2b illustrates a system of FIG. 2a experiencing a vertical shift misalignment of the receiver module.

As a way of example, let's assume that the receiver module 14 experiences a vertical shift misalignment in a direction designated by vector AB as shown in FIG. 2b. Accordingly the direction and amplitude of this misalignment is measured by circuitry 44 as described above. When the amplitude of the misalignment exceeds the threshold, a signal is sent to drive circuitry 23 to re-route the data to another set of detectors. The new detectors are selected in a direction opposite to the direction of the misalignment, i.e. in the direction opposite to the vector AB so as to compensate for the occurred misalignment. As illustrated in FIG. 2b, the new set of detectors may include, e.g., detectors a2, a3 and a4. The new detectors now receive data from the correct physical location and ensure reliable data transmission through the system. A new position of the alignment laser 36 on the detector 40 which corresponds to the use of the new set of detectors is now stored, thus replacing the previous stored position of the alignment laser. Accordingly, all new measurements of the misalignment between the modules are referred to the new stored position. If required, a new threshold value identifying maximal deviations from the stored position may be introduced.

Figure 2C:
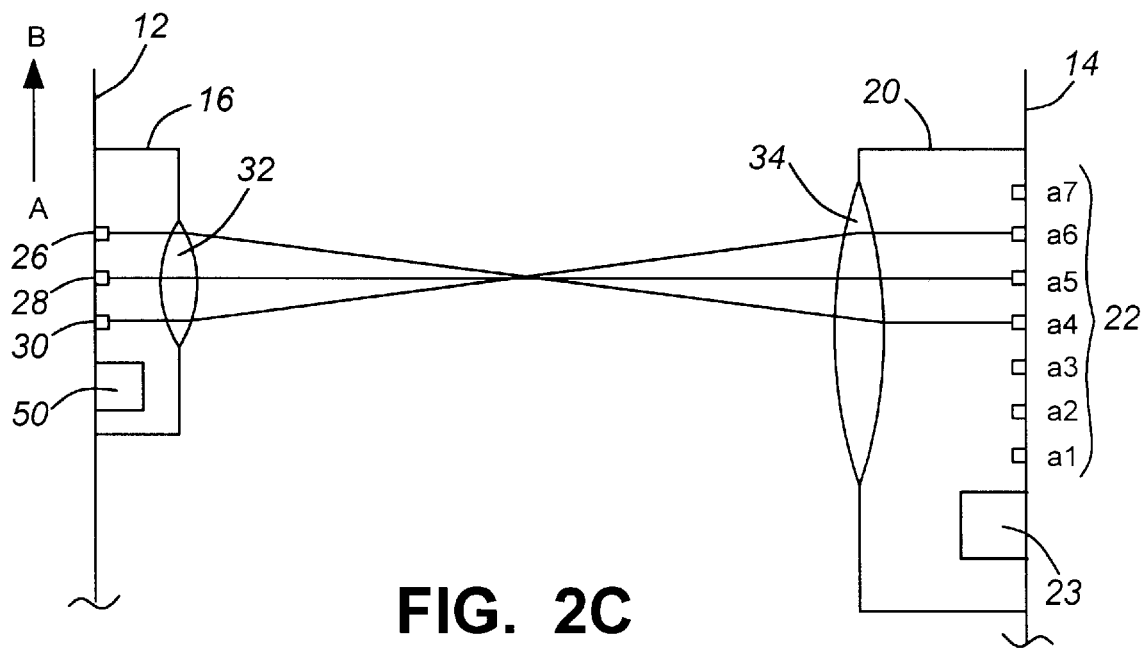
FIG. 2c illustrates a system of FIG. 2a experiencing a vertical shift misalignment of the transmitter module.

Alternatively, it may happen that the transmitter module 12 experiences a misalignment similar to that of the receiver module described above, i.e. a vertical shift misalignment in a direction designated AB as shown in FIG. 2c. Then, assuming that the re-routing is supposed to be done between the receiver elements 22, it means that it should be done in a direction coinciding with the direction of the misalignment to provide reliable data transmission, i.e. in the direction AB. New detectors in use may be, e.g., detectors a4, a5 and a6 correspondingly as illustrated in FIG. 2c.

Figure 2D:
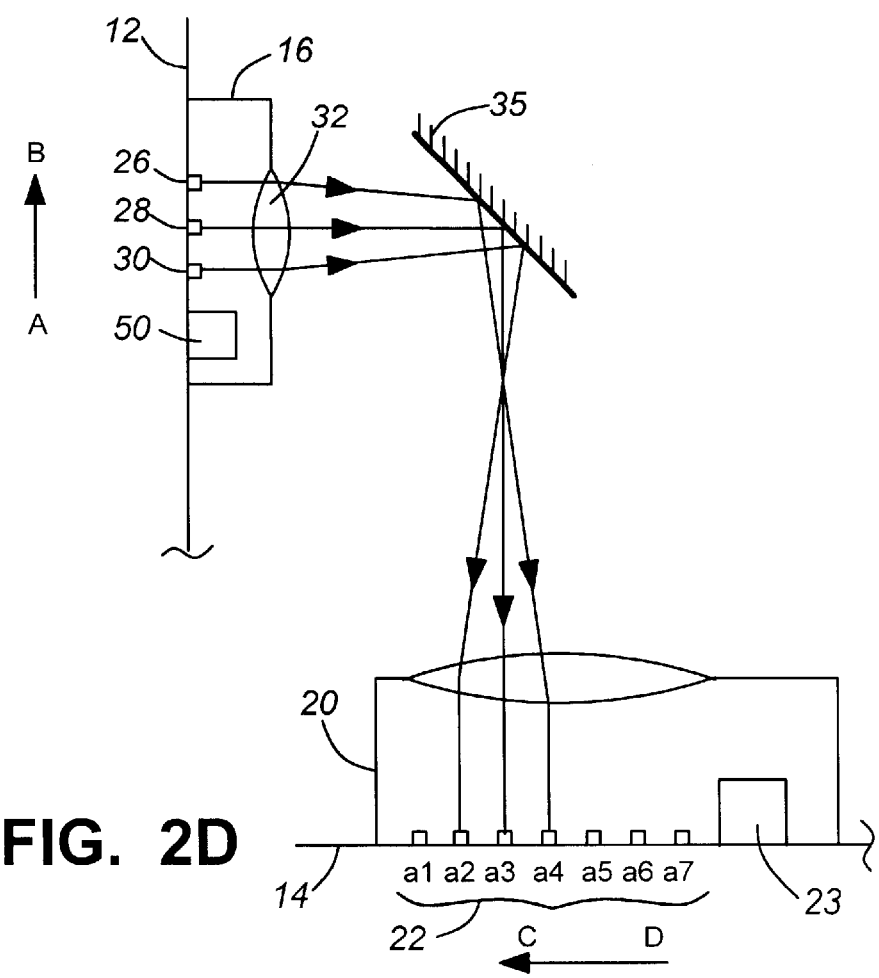
FIG. 2d illustrates a definition of a direction associated with the direction of the misalignment.

In other situations, more complex types of misalignments may occur and/or the light generated by the transmitter elements may be projected onto receiver elements with the use of optical elements, e.g. mirrors, prisms etc., which change the initial direction of the laser beams generated by the transmitter elements. In such situations, the new detectors for receiving data will be selected in a direction associated with the direction of the misalignment, the direction of re-routing being dependent on how an image plane of the transmitter module is projected onto the receiver module. As a way of example, FIG. 2d illustrates a scheme where light generated by the transmitter module 12 is re-directed onto the receiver module 20 at an angle of 90 degrees by using a plane mirror 35. In this arrangement, when the misalignment of the transmitter module occurs in a direction designated by vector AB, the direction associated with the direction of the misalignment will be identified as a direction CD shown in FIG. 2d. Accordingly, the re-routing between the receiver elements will be made along the direction CD.

The optical interconnect system 10 described above has the following dimensions: separation between modules 12 and 14 is about ~10 inches, focal lengths of the lenses 32 and 34 are about 10 mm, an angle between the laser beams generated by adjacent lasers, designated by numeral 19 in FIG. 1, is about 1 degree. These dimensions provide an alignment tolerance of about 4 mm over 10 inches of interconnect distance. Other dimensions of the system may be also used to provide alignment of the system for larger distances, e.g. up to meters.

An initial set-up of the system 10 may be done by using one of the methods providing cycling through the redundant elements, e.g. a method similar to that described in a patent application Ser. No. 09/150,242 to Goodwill which is incorporated herein by reference.

The system and method of its operation described above are suitable for compensation of relatively slow misalignments, i.e. the misalignments which have a typical time interval between changes much greater than time intervals between re-routing of data.

Instead of the system described above which has redundant elements of the receiver only, it is contemplated that the system may include redundant elements of the transmitter only, or both of the receiver and the transmitter. The number of redundant elements may be arbitrary, depending on the system requirements.

The elements of the transmitter and/or receiver may be arranged into a one-dimensional or two-dimensional array, or any other pattern providing the required optical transmission or collection.

Instead of the system described above providing one-directional link, an alternative embodiment of the system may provide a bi-directional link, having one transmitter and one receiver at each module for corresponding transmittance and reception of data.

In another embodiment it is contemplated that the elements of the receiver 20 and/or the transmitter 16 may be arranged into clusters. Conveniently, the number of clusters is redundant and the number of elements in each cluster is sufficient for the transmission of the required number of data channels. If required, the elements may be shared between different clusters. Correspondingly, re-routing of data is performed between redundant clusters of the receiver 20 and/or the transmitter 16, depending on the direction and the amplitude of the misalignment.

The means for monitoring the misalignment may include means for monitoring a signal connection parameter between the transmitter and the receiver, e.g. a signal parameter at the receiver or at the transmitter. Alternatively the signal connection parameter may be a signal parameter of at least one element of at least one of the transmitter and the receiver. Conveniently, the signal connection parameter is an intensity of the data signal. Instead of measuring a position of the alignment laser on the sensing position detector, it is possible to measure an intensity distribution on the dedicated receiver element or on the number of receiver elements to identify the direction of the misalignment.

Numerous modifications can be made to the embodiments described above. The elements of the transmitter 16 chosen to be VCSEL in the first embodiment may be substituted by other types of emitters or optical modulators. The emitters may be VCSEL, LED, edge emitting laser diodes, or other known devices. The modulators may be selected from modulators based on magneto-optic effect, modulators including liquid crystal devices, ferroelectric modulators, e.g. PLZT modulators, modulators including piezo-electric crystals, modulators including deformable mirrors, electro-optical semiconductor hetero-structure modulators, optical cavity modulators, or other known modulators. Similarly, other modifications of the embodiment may include use of integrated optics components (holographic elements, fan-out gratings, diffractive lenses) and/or other bulk optical elements, e.g. arrays of microlenses, prisms and splitters instead of lenses used for collimating and focusing laser beams, or other known optical components. The receiver elements may be a detector array or single detectors, the light may fall directly onto detectors, or a microlens concentrator array can be included which enhances the misalignment tolerance and increase the efficiency of light collection.

Modifications to the means for monitoring misalignments between the modules may include detectors for monitoring lateral and vertical misalignments, detectors for monitoring tilt misalignments, or means for monitoring a signal level at the receiver, e.g. a detector measuring a photocurrent at the receiver, or other suitable devices. The transmitter elements may have a separate lens from the lens of the alignment laser, or the transmitter elements and the alignment laser may share a lens. The detectors may be chosen from PIN detectors, metal-semiconductor-metal detector, avalanche photodiode, or other suitable detectors.

Further modifications to the system may include different means for providing feedback between the transmitter and the receiver regarding the misalignments, which may be connected by optical fiber, electrical cable, electrical backplane, or other convenient means.

As an alternative to the embodiment described above, means for determining the direction and the amplitude of the misalignment may include means for measuring an intensity distribution at the receiver elements.

The transmitter and/or receiver, or the whole system described above are integrated within a package or several packages, thus providing compactness and efficient use of space.

In the embodiment described above, the interconnection is formed between two modules, each of the modules may be a board, a chip, an equipment rack, an equipment shelf or an equipment frame. The transmitters and receivers may be housed in different packages, they may be built as separate chips within the same package, or they may be placed on the same chip.

Free space interconnect systems formed using the techniques described above are more tolerant to misalignments between circuit packs compared to electrical connectors or other existing free space optical interconnect systems. It also provides more reliable data transmission due to timely re-routing of data between redundant elements and ensures that the quality of data transmission does not substantially deteriorate and/or the optical connection is not lost. The use of redundant clusters of elements in the transmitter and/or receiver modules obviates the need of packaging which requires precise alignment and which is often expensive and bulky. The interconnect systems based on the present invention have simpler mechanical design, have no moving parts and may be implemented with lower cost mechanics. As a result, they can be manufactured more readily and at much lower cost, providing higher reliability at the same time. For example, using the embodiments of the invention, a free space optical link offering multiple channels (>32 per sq. in.) at a rate of about 1 Gb/s each can be established in the conventional low cost mechanical environment typically encountered with telecom, data and computing products. The optical interconnect system described above is particularly advantageous for high capacity ATM and IP switches for core or larger enterprise customers and opens new possibilities for new systems architectures and network technologies for terabit routers, and for multi-processor computers.

Although specific embodiments of the invention have been described in detail, it will be apparent to one skilled in the art that variations and modifications to the embodiments may be made within the scope of the following claims.

What is claimed is:

1. A free space optical interconnect system comprising:
    a transmitter and a receiver, at least one of the transmitter and the receiver comprising a plurality of elements whose number is redundant;
    means for monitoring a misalignment between the transmitter and the receiver, including means for determining a direction and an amplitude of the misalignment; and means for re-routing data from an element which is misaligned to a redundant element selected along a direction associated with the direction of the misalignment so as to provide data transmission through the system, the re-routing being performed in response to a signal generated by the monitoring means.

2. A system of claim 1, wherein the means for monitoring the misalignment comprises means for monitoring a signal connection parameter between the transmitter and the receiver.

3. A system of claim 2, wherein the means for monitoring the signal connection parameter comprises means for monitoring a signal parameter at the receiver.

4. A system of claim 2, wherein the means for monitoring the signal connection parameter comprises means for monitoring a signal parameter at the transmitter.

5. A system of claim 2, wherein the means for monitoring the signal connection parameter comprises means for monitoring a signal parameter of at least one element of at least one of the transmitter and the receiver.

6. A system of claim 2, wherein the signal connection parameter is an intensity of the data signal.

7. A system of claim 1, wherein the means for monitoring the misalignment comprises a dedicated alignment laser and a dedicated detector.

8. A system of claim 7, wherein the means for determining the direction and the amplitude of the misalignment comprises means for measuring a position of a laser spot of the dedicated alignment laser on the dedicated detector.

9. A system of claim 1, wherein the means for monitoring the misalignment comprises a detector selected from the group consisting of detectors for monitoring lateral and vertical misalignments, and detectors for monitoring tilt misalignments.

10. A system of claim 1, wherein the means for monitoring the misalignment further comprises means for providing feedback between the transmitter and the receiver regarding the misalignment.

11. A system of claim 10, wherein the means for providing the feedback comprises means selected from the group consisting of optical fiber, LED, electrical cable and electrical backplane.

12. A system of claim 3, wherein the means for determining the direction and the amplitude of the misalignment comprises means for measuring an intensity distribution at the receiver elements.

13. A system of claim 1, wherein the receiver only has redundant elements.

14. A system of claim 1, wherein the transmitter only has redundant elements.

15. A system of claim 1, wherein the elements are arranged into a one-dimensional array.

16. A system of claim 1, wherein the elements are arranged into a two-dimensional array.

17. A system of claim 1, wherein the elements are arranged so as to form a pre-determined pattern which provides a required optical transmission or collection.

18. A system of claim 1, the system comprising one transmitter and one receiver only for a uni-directional interconnection.

19. A system of claim 1, the system comprising a first module and a second module, each module comprising one transmitter and one receiver for corresponding bi-directional transmittance and receiving of data.

20. A system of claim 1, wherein the redundant elements are arranged into clusters, the number of clusters being redundant and the number of elements in each cluster being sufficient to accommodate the number of data channels to be transmitted.

21. A system of claim 20, wherein the means for re-routing comprises means for re-routing data from a cluster which is misaligned to a redundant cluster which provides data transmission through the system.

22. A system of claim 21, wherein the elements are shared between different clusters.

23. A system of claim 1, wherein the elements of the transmitter are optical emitters.

24. A system of claim 23, wherein the emitters are selected from the group consisting of VCSEL, SLD, LED, and edge emitting laser diodes.

25. A system of claim 1, wherein the elements of the transmitter are optical modulators.

26. A system of claim 1, wherein the elements of the receiver are selected from the group consisting of PIN detector, metal-semiconductor-metal detector and avalanche photodiode.

27. A system of claim 1, the system being integrated within a package.

28. A module for free space optical interconnect system, comprising:
at least one of a transmitter and a receiver, at least one of the transmitter and the receiver comprising a plurality of elements whose number is redundant;
means for monitoring a misalignment of the module, including means for determining a direction and an amplitude of the misalignment; and
means for re-routing data from an element which is misaligned to a redundant element selected along a direction associated with the direction of the misalignment so as to ensure data transmission through the system, the re-routing being performed in response to a signal generated by the monitoring means.

29. A module of claim 28, wherein the means for monitoring the misalignment comprises means for monitoring a signal connection parameter at the module.

30. A module of claim 29, wherein the signal connection parameter is an intensity of the signal.

31. A module of claim 28, wherein the means for monitoring the misalignment comprises detectors selected from the group consisting of detectors for monitoring lateral and vertical misalignments, and detectors for monitoring tilt misalignments.

32. A module of claim 28 wherein the means for determining the direction and the amplitude of the misalignment comprises means for measuring a position of a laser spot of a dedicated alignment laser on a dedicated detector.

33. A module of claim 28, wherein the means for determining the direction and the amplitude of the misalignment comprises means for measuring an intensity distribution at the receiver elements.

34. A module of claim 28, wherein the module comprises one transmitter only.

35. A module of claim 28, wherein the module comprises one receiver only.

36. A module of claim 28, wherein the module comprises one transmitter and one receiver only for corresponding transmitting and receiving of data in a bi-directional optical interconnect system.

37. A module of claim 28, wherein the elements are arranged into a one-dimensional array.

38. A module of claim 28, wherein the elements are arranged into a two-dimensional array.

39. A module of claim 28, wherein the elements are arranged so as to form a pre-determined pattern which provides a required optical transmission or collection.

40. A module of claim 28, wherein the redundant elements are arranged into clusters, the number of clusters being redundant and the number of elements in each cluster being sufficient to accommodate the number of data channels to be transmitted.

41. A module of claim 40, wherein the means for re-routing comprises means for re-routing data from a cluster which is misaligned to a redundant cluster which provides data transmission through the system.

42. A module of claim 41, wherein the elements are shared between different clusters.

43. A module of claim 28, wherein the elements of the transmitter are optical emitters.

44. A module of claim 43, wherein the emitters are selected from the group consisting of VCSEL, SLD, LED, and edge emitting laser diodes.

45. A module of claim 28, wherein the elements of the transmitter are optical modulators.

46. A module of claim 28, wherein the elements of the receiver are selected from the group consisting of PIN detector, metal-semiconductor-metal detector and avalanche photodiode.

47. A module of claim 28, the module being integrated within a package.

48. A method of operating a free space optical interconnect system, comprising a transmitter and a receiver, at least one of the transmitter and the receiver having a plurality of elements whose number is redundant, the method comprising the steps of:
(a) monitoring a misalignment between the transmitter and the receiver, including determining a direction and an amplitude of the misalignment; and
(b) when the amplitude of the misalignment is exceeding the threshold value, re-routing data from an element which is misaligned to a redundant element selected along a direction associated with the direction of the misalignment so as to provide data transmission through the system.

49. A method of claim 48, wherein the step of monitoring the misalignment comprises monitoring a signal connection parameter between the transmitter and the receiver.

50. A method of claim 49, wherein the step of monitoring the signal connection parameter comprises monitoring a signal parameter at the receiver.

51. A method of claim 49, wherein the step of monitoring the signal connection parameter comprises monitoring a signal parameter at the transmitter.

52. A method of claim 49, the step of monitoring the signal connection parameter comprises monitoring a signal parameter of at least one element of at least one of the transmitter and the receiver.

53. A method of claims 49, the step of monitoring the signal connection parameter comprises monitoring intensity of the data signal.

54. A method of claim 48, wherein the step of determining the direction and the amplitude of the misalignment comprises measuring a position of a laser spot of a dedicated alignment laser on a dedicated detector.

55. A method of claim 48, wherein the step of determining of the direction and the amplitude of the misalignment comprises measuring an intensity distribution at the receiver elements.

* * * * *